(12) United States Patent
Shigeta et al.

(10) Patent No.: US 10,498,277 B2
(45) Date of Patent: Dec. 3, 2019

(54) DRIVE SYSTEM AND INVERTER

(71) Applicants: KABUSHIKI KAISHA TOSHIBA, Minato-ku (JP); Toshiba Infrastructure Systems & Solutions Corporation, Kawasaki-shi (JP)

(72) Inventors: Tomoaki Shigeta, Fuchu (JP); Shun Taniguchi, Fuchu (JP); Kentaro Suzuki, Hachioji (JP); Kazuaki Yuuki, Tokorozawa (JP)

(73) Assignees: KABUSHIKI KAISHA TOSHIBA, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 15/904,534

(22) Filed: Feb. 26, 2018

(65) Prior Publication Data

US 2018/0191285 A1 Jul. 5, 2018

Related U.S. Application Data

(63) Continuation of application No. PCT/JP2016/064460, filed on May 16, 2016.

(30) Foreign Application Priority Data

Aug. 26, 2015 (JP) .................................. 2015-167067

(51) Int. Cl.
*H02P 21/24* (2016.01)
*H02P 21/06* (2016.01)
(Continued)

(52) U.S. Cl.
CPC .............. *H02P 21/24* (2016.02); *H02P 21/06* (2013.01); *H02P 21/14* (2013.01); *H02P 21/18* (2016.02);
(Continued)

(58) Field of Classification Search
CPC .......... H02P 21/32; H02P 27/04; H02P 21/00; H02P 6/00; H02P 1/00; H02P 1/46;
(Continued)

(56) References Cited

U.S. PATENT DOCUMENTS 6,025,692 A 2/2000 Yamada et al.
8,154,231 B2 * 4/2012 Komatsu ................ B62D 5/046
318/400.01
(Continued)

FOREIGN PATENT DOCUMENTS

CN 102710205 A 10/2012
CN 103701395 4/2014
(Continued)

OTHER PUBLICATIONS

International Search Report dated Aug. 2, 2016 in PCT/JP2016/064460, filed on May 16, 2016 (with English Translation).
(Continued)

*Primary Examiner* — Antony M Paul
(74) *Attorney, Agent, or Firm* — Oblon, McClelland, Maier & Neustadt, L.L.P.

(57) ABSTRACT

A drive system of an embodiment includes an inverter for driving an electric motor; a detector that detects an electric current value output from the inverter; command generators that generate an electric current command value corresponding to an electric current to be supplied to the electric motor and a gate command of the inverter so that the electric current command value matches the electric current value; calculators that calculate an voltage target vector of the inverter and a rotation phase estimation value of the electric motor based on the electric current value and the voltage target vector, in an initial estimation of when activating the inverter. The electric current command value in the initial estimation is a value to supply an electric current for
(Continued)

magnetically saturating a rotor of the electric motor, and a dynamic inductance of the electric motor used for calculating the rotation phase estimation value is a value of when the rotor of the electric motor is magnetically saturated.

8 Claims, 8 Drawing Sheets

(51) Int. Cl.
    *H02P 21/22*     (2016.01)
    *H02P 21/14*     (2016.01)
    *H02P 27/06*     (2006.01)
    *H02P 21/18*     (2016.01)
    *H02P 25/089*     (2016.01)

(52) U.S. Cl.
    CPC .............. *H02P 21/22* (2016.02); *H02P 27/06* (2013.01); *H02P 25/089* (2016.02)

(58) Field of Classification Search
    CPC .. H02P 3/18; H02P 23/00; H02P 27/00; H02P 21/14; H02P 27/06; H02K 29/06; G05B 11/28; G05B 11/01; G05B 13/00
    USPC ....... 318/400.01, 400.02, 560, 650, 652, 55, 318/700, 400.04, 400.07, 400.12, 400.14, 318/400.15, 400.32, 701, 715, 721, 725, 318/727, 799, 800, 801, 805, 808, 809, 318/812, 254.1, 430, 432, 437, 490, 504, 318/599, 807, 811; 388/800, 847, 907.5
    See application file for complete search history.

(56) References Cited

U.S. PATENT DOCUMENTS 9,431,947 B2 * 8/2016 Thomas .................. H02P 21/24

| | | |
|---|---|---|
| 2002/0180398 A1 | 12/2002 | Nakatsugawa et al. |
| 2011/0248659 A1 | 10/2011 | Balazovic et al. |
| 2011/0285337 A1 | 11/2011 | Taniguchi et al. |
| 2015/0069941 A1* | 3/2015 | Iwaji .......................... H02P 6/18 318/400.11 |

FOREIGN PATENT DOCUMENTS

| | | |
|---|---|---|
| EP | 2 437 391 A1 | 4/2012 |
| JP | 9-252588 | 9/1997 |
| JP | 2000-92891 A | 3/2000 |
| JP | 2001-78486 | 3/2001 |
| JP | 2001-339999 A | 12/2001 |
| JP | 2002-58294 | 2/2002 |
| JP | 2002-360000 | 12/2002 |
| JP | 3663937 B2 | 6/2005 |
| JP | 2011-172382 | 9/2011 |
| JP | 5534935 B2 | 7/2014 |
| KR | 10-2012-0024554 A | 3/2012 |
| WO | WO 2014-157628 A1 | 10/2014 |

OTHER PUBLICATIONS

Written Opinion dated Aug. 2, 2016 in PCT/JP2016/064460, filed on May 16, 2016.

Yoshiaki Kano, Member, IEEE, "Torque Ripple Reduction of Saliency-Based Sensorless Drive Concentrated-Winding IPMSM Using Novel Flux Barrier", IEEE Transaction on Industry Applications, vol. 51, No. 4, Jul./Aug. 2015, 12 pages.

Gun-Myoung Kim, Byoung-Gun Park, In-Soung Jung, Dong-Seok Hyun, "Simple Rotor Position Estimation Using the Current Saturation at a standstill", Feb. 10, 2010, 5 pages.

* cited by examiner

DRIVE SYSTEM AND INVERTER

CROSS-REFERENCE TO RELATED APPLICATIONS

This application is Continuation Application of PCT Application No. PCT/JP2016/064460, filed May 16, 2016 and based upon and claiming the benefit of priority from the Japanese Patent Application No. 2015-167067, filed Aug. 26, 2015, the entire contents of all of which are incorporated herein by reference.

FIELD

Embodiments described herein relate generally to a drive system and an inverter.

BACKGROUND

In an inverter device that controls an electric motor, to reduce size, weight, and cost, and to improve reliability, a sensorless control method is suggested, in which a position sensor of a rotor, such as a resolver encoder, is not used. For example, a method of estimating a rotor position by using voltage information generated by a no-load magnetic flux inter-linked to a coil, and a method of using harmonic current information generated due to a rotor salient pole while superposing a harmonic voltage are suggested.

In an inverter used for railroad or industrial applications, an initial estimation of a rotor position is necessary when activating an inverter from a coasting operation, or at the time of recovery from an instantaneous power failure, etc. In this case, a method of estimating the rotor position by controlling a switching pattern of the inverter upon reactivation to observe an electric current generated by short circuiting the coil, and a method of estimating the rotor position by suppressing an electric current generated by a magnet induced voltage to zero and then utilizing a feature quantity generated are suggested.

Furthermore, as a free run reactivation system for a permanent magnet synchronization motor (PMSM), a method of estimating the rotor position by switching an inverter circuit so as to output a non-zero voltage vector, and using one formula regardless of a motor speed is suggested.

In the case of controlling, for example, a synchronous reluctance motor (SynRM) as an electric motor, an inductance is significantly changed depending on the electric current to be supplied. In the PMSM, since the rotor includes a magnet, a center bridge of the rotor is always in a magnetic saturation state. Therefore, the change in inductance with respect to a change in an electric current (dynamic inductance) is small. In contrast, in the SynRM, since a magnetic saturation is enhanced at the center bridge of the rotor by supplying an electric current, the change in inductance with respect to the change in the electric current becomes greater than in the PMSM.

When performing the sensorless control, for example, in the case of using an inductance, as a parameter for control, when a magnetic saturation is not occurred, since a gap will occur between the actual motor parameter and the parameter for control, a rotation phase of the electric motor would not be accurately calculated, thereby disabling or destabilizing the sensorless control.

DETAILED DESCRIPTION

A drive system according to an embodiment comprising: an electric motor; an inverter main circuit that outputs an alternating electric current for driving the electric motor; an electric current detector that detects an electric current value of the alternating electric current output from the inverter main circuit; an electric current command generator that generates an electric current command value corresponding to an electric current to be supplied to the electric motor; a gate command generator that generates a gate command of the inverter main circuit so that the electric current command value matches the electric current value detected by the electric current detector; an output voltage target vector calculator that calculates an output voltage target vector of the inverter main circuit based on the gate command; and a rotation phase estimator that calculates a rotation phase estimation value of the electric motor based on the electric current value detected by the electric current detector and the output voltage target vector of the inverter main circuit, in an initial estimation of when activating the inverter main circuit. The electric current command value in the initial estimation is a value to supply an electric current for magnetically saturating a rotor of the electric motor. In the rotation phase estimator, a dynamic inductance of the electric motor used for calculating the rotation phase estimation value is a value of when the rotor of the electric motor is magnetically saturated.

Hereinafter, a drive system and an inverter device of a first embodiment will be explained with reference to the drawings.

Figure 1:
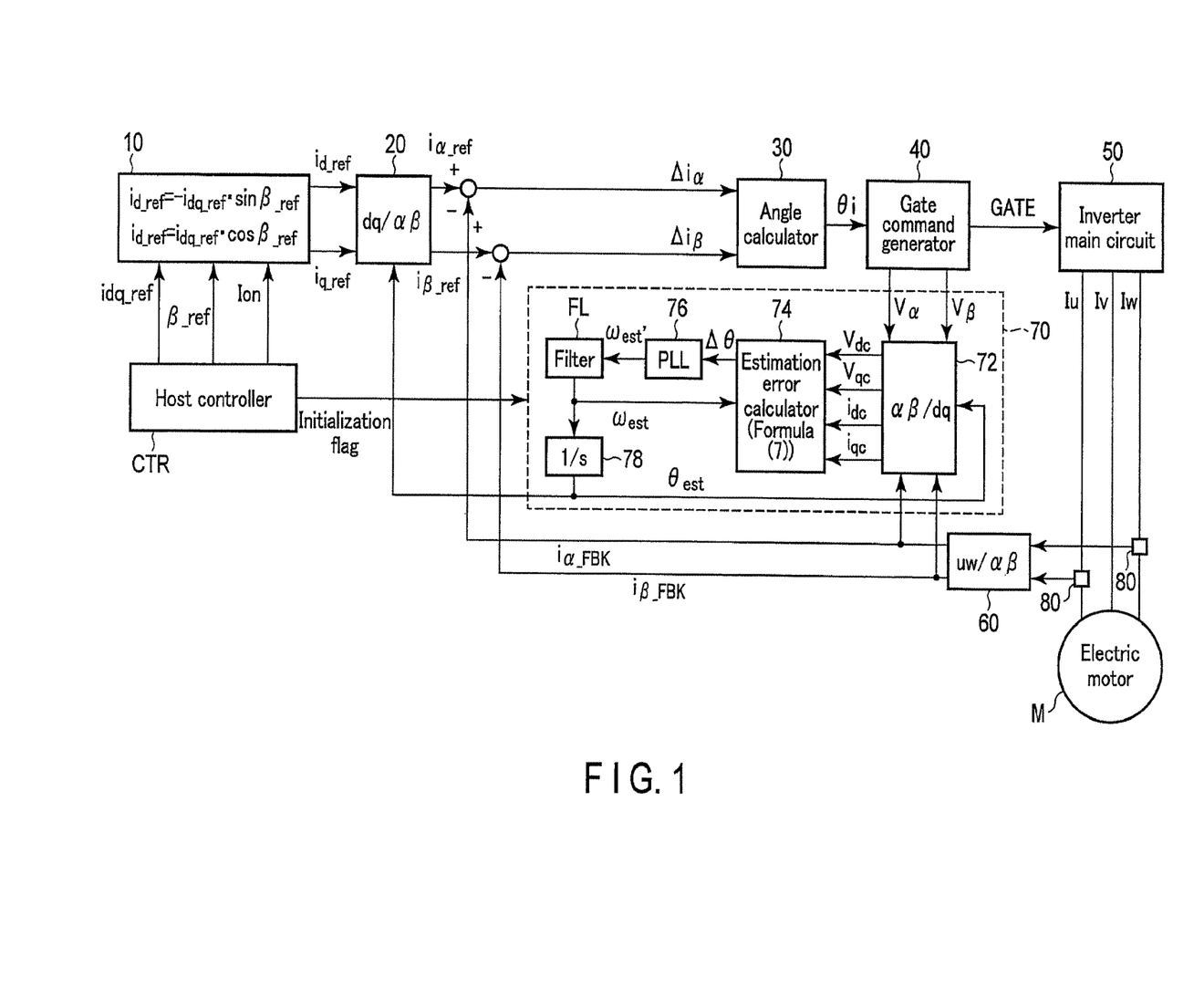
FIG. 1 is a block diagram for explaining a configuration example of a drive system and an inverter of a first embodiment.

FIG. 1 is a block diagram for explaining a configuration example of the drive system and the inverter of the first embodiment.

The drive system of the present embodiment comprises an electric motor M and the inverter device. The inverter comprises an electric current command generator 10, a dq/αβ converter 20, an angle calculator 30, a gate command generator 40, an inverter main circuit 50, a uw/αβ converter 60, a rotation phase estimator 70, and electric current detectors 80.

The electric current command generator 10 receives an electric current amplitude command idq_ref, an electric current phase command β_ref, and an electric current conducting flag Ion from a host controller CTR. The electric current command generator 10 calculates a d-axis electric current command value id_ref and a q-axis electric current command value iq_ref, to be used for supplying an electric current to the electric motor M, based on the electric current amplitude command and the electric current phase command, and outputs the values when the electric current conducting flag Ion is ON (high level). The d-axis electric current command value id_ref and the q-axis electric current command value iq_ref are obtained by the following formula.

$$id\_ref = -idq\_ref \cdot \sin \beta\_ref$$

$$iq\_ref = idq\_ref \cdot \cos \beta\_ref$$

Figure 2:
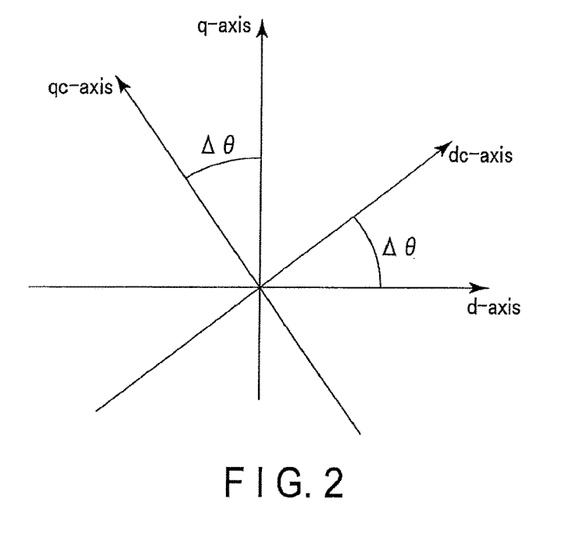
FIG. 2 is a diagram for explaining a definition of a d-axis, a q-axis, and an estimated rotation coordinate system (a dc-axis, a qc-axis) in the drive system and the inverter of the first embodiment.

FIG. 2 is a diagram for explaining a definition of a d-axis, a q-axis, and an estimated rotation coordinate system (a dc-axis, a qc-axis) in the drive system and the inverter of the first embodiment.

The d-axis is a vector axis at which a static inductance becomes the smallest in the rotor of the electric motor M. The q-axis is a vector axis that is orthogonal to the d-axis at an electric angle. The estimated rotation coordinate system corresponds to the d-axis and the q-axis at estimated positions of the rotor. In other words, the dc-axis is a vector axis rotated by an estimation error Δθ from the d-axis, and the qc-axis is a vector axis rotated by the estimation error Δθ from the q-axis. The d-axis electric current command value id_ref obtained by the above formula is a vector value in a direction rotated 180 degrees from the dc-axis. The q-axis electric current command value iq_ref is a vector value in the direction of the qc-axis.

The dq/αβ converter 20 converts the d-axis electric current command value id_ref and the q-axis electric current command value iq_ref expressed by a coordinate system of the dq-axis into an α-axis electric current command value iα_ref and a β-axis electric current command value iβ_ref expressed by a fixed coordinate system of an αβ-axis. An α-axis indicates a U-phase coil axis of the electric motor M, and a β-axis is an axis that is orthogonal to the α-axis. A value expressed by the fixed coordinate system of the αβ-axis can be calculated without using a rotor phase angle of the electric motor.

Differentiators are arranged at a subsequent stage of the dq/αβ converter 20. The α-axis electric current command value iα_13 ref and the (β-axis electric current command value iβ_ref that are output from the dq/αβ converter 20 are input to the differentiators. Furthermore, electric current values of electric currents output from the inverter main circuit 50 are detected by the electric current detectors 80, and electric current values iα_FBK and iβ_FBK converted into the αβ-axis fixed coordinate system by the uw/αβ converter 60 are input to the differentiators. The differentiators output an electric current vector deviation αiα between the α-axis electric current command value iα_13 ref and the electric current value iα_FBK output from the inverter main circuit 50, and an electric current vector deviation Δiβ between the β-axis electric current command value iβ_ref and the electric current value iβ_FBK output from the inverter main circuit 50.

The electric current vector deviation Δiα and the electric current vector deviation Δiβ output from the differentiators are input to the angle calculator 30. The angle calculator 30 calculates an angle θi of the electric current vector deviation of the αβ-axis (fixed coordinate system) from the input electric current vector deviations Δiα and Δiβ. The angle θi is obtained by an arc tangent ($\tan^{-1}$) of the electric current vector deviations Δiα and Δiβ.

Figure 3:
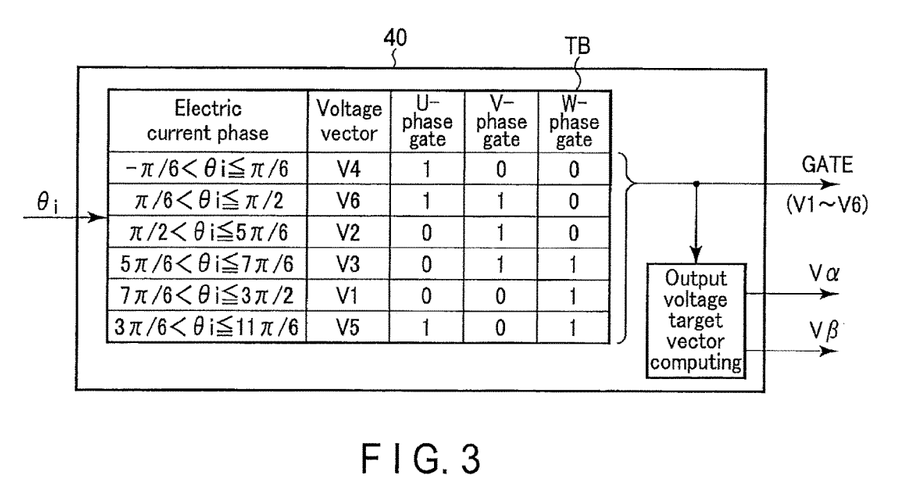
FIG. 3 is a diagram for explaining a configuration example of a gate command generator shown in FIG. 1.

FIG. 3 is a diagram for explaining a configuration example of the gate command generator shown in FIG. 1.

The gate command generator 40 outputs a gate command to be provided to switching elements of a U-phase, a V-phase, and a W-phase of the inverter main circuit 50 so that the electric current command value and the electric current value actually output from the inverter main circuit 50 match.

In the present embodiment, since the inverter main circuit 50 has six (two phases each) switching elements, and therefore the combination of states of the switching elements include eight types. Consequently, by considering a phase difference of each phase in the output voltage of the inverter main circuit 50, eight voltage vectors corresponding to each switching state are assumed. The eight voltage vectors may be expressed as six basic voltage vectors V1 to V6 whose phases are different from each other by π/3 and which have the same magnitude, and as two zero voltage vectors V0 and V7 Here, the eight voltage vectors correspond to the eight types of the switching states, which, for example, are expressed as "1" when the switching element on a positive side of each phase is ON, and expressed as "0" when the switching element on a negative side of each phase is OFF.

In the present embodiment, an example of an electric current tracking type PWM control that generates a gate command by selecting a non-zero voltage vector (voltage vectors V1 to V6 that are other than the zero voltage vectors V0=(000) and 7V=(111)) based on the electric current command value and an angle θi of the electric current vector deviation of the detected electric currents will be explained. The voltage vector V1 corresponds to (001) when expressed by a UVW gate command. In the same manner, V2 to V7 and V0 correspond to (010), (011), (100), (101), (110), (111), and (000). Of these vectors, V0 and V7 are referred to as zero voltage vectors since the UVW interphase voltage is 0V. V2 to V6 are referred to as non-zero voltage vectors. When the inverter main circuit 50 outputs the zero voltage vector V0 or V7, the electric current is changed only by an induced voltage of the rotor; therefore, the amount of change becomes small. Therefore, in the present embodiment, in order to increase an electric current differential term when detecting the rotor position, only the non-zero voltage vector is selected as the voltage vector.

The gate command generator 40 comprises a table TB that stores gate commands of the U-phase, the V-phase, and the W-phase with respect to the range of angle θi, and an output voltage target vector calculator 42. The gate command generator 40 uses the table TB to select a voltage vector that is closest to the vector of angle θi on the basis of a voltage vector V4 (=0), and outputs a gate command corresponding to the selected voltage vector.

The output voltage target vector calculator 42 receives the gate command output from the table TB, performs an αβ conversion on the gate command corresponding to the UVW phase, and calculates and outputs output voltage target vectors Vα and Vβ of the aβ-axis fixed coordinate system. The output voltage target vectors Vα and Vβ are obtained by performing the αβ conversion on three-phase alternating-current voltage commands that can be calculated from the gate command of the inverter main circuit 50, and are vector values of the output voltage of the inverter main circuit 50 which the gate command attempts to realize.

The inverter main circuit 50 comprises a direct-current power source (direct-current load) and two switching elements of each of the U-phase, the V-phase, and the W-phase. The two switching elements of each phase are connected in series between a direct-current line connected to a positive terminal of the direct-current power source and a direct-current line connected to a negative terminal of the direct-current power source. The switching elements of the inverter main circuit 50 are controlled by the gate command received from the gate command generator 40. The inverter main circuit 50 is a three-phase alternating-current inverter that outputs a U-phase electric current Iu, a V-phase electric current Iv, and a W-phase electric current Iw to the electric motor M which is an alternating-current load. The inverter main circuit 50 is also capable of charging an electric power generated at the electric motor M to a secondary battery which is a direct-current power source.

Figure 4:
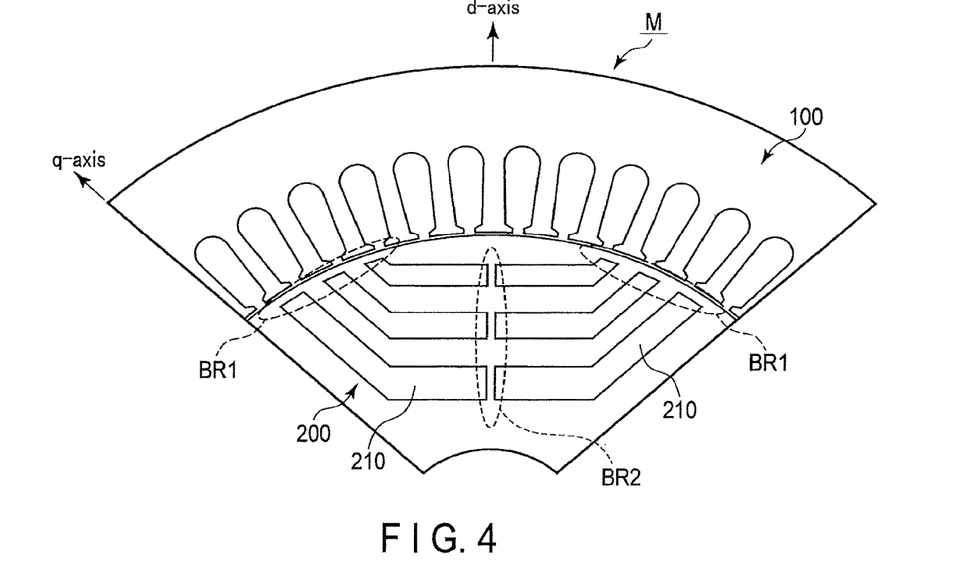
FIG. 4 is a diagram for explaining a configuration example of an electric motor shown in FIG. 1.

FIG. 4 is a diagram for explaining a configuration example of the electric motor shown in FIG. 1. Here, only a part of the electric motor M is shown. A stator 100 and a rotor 200 of the electric motor M are obtained by multiple combinations of the configuration shown, for example, in FIG. 4.

The electric motor M is, for example, a synchronous reluctance motor comprising the stator 100 and the rotor 200. The rotor 200 includes air gaps 210, outer circumference bridges BR1, and a center bridge BR2.

The center bridge BR2 is arranged on a line between a given point on an outer circumference and a center of the rotor 200. The line on which the center bridge BR2 is arranged coincides with the d-axis. The outer circumference bridges BR1 are positioned between the outer circumference of the rotor 200 and the air gaps 210. On a portion of the electric motor M shown in FIG. 4, six air gaps 210 extending from the outer circumference part towards the center part of the rotor 200 are provided. The air gaps 210 extend between the center bridge BR2 and the outer circumference bridges BR1.

In the initial estimation of when activating the inverter main circuit 50, the rotation phase estimator 70 calculates a rotation phase estimation value of the electric motor M based on electric current values detected at the electric current detectors 80 and output voltage target values Vα and Vβ of the inverter main circuit 50.

The rotation phase estimator 70 comprises an αβ/dq converter 72, an estimation error calculator 74, a PPL calculator 76, a low-pass filter FL, and an integrator 78.

The αβ/dq converter 72 receives a rotation phase estimation value best from the integrator 78, the output voltage target vectors Vα and Vβ of the αβ-axis fixed coordinate system from the gate command generator, and electric current values iα_FBK and iβ_FBK of the αβ-axis fixed coordinate system from the uw/αβ converter 60. These vector values are converted into a dq-axis coordinate system, and are output. The values output from the αβ/dq converter 72 are voltage vectors Vdc and Vqc and electric current vectors idc and iqc of a dcqc coordinate system including the estimation error Δθ.

The estimation error calculator 74 receives the voltage vectors Vdc and Vqc and the electric current vectors idc and iqc from the αβ/dq converter 72, and calculates the estimation error Δθ based thereon. In the following, computing equations of the estimation error Δθ will be explained.

A voltage equation of the SynRM is expressed by formula 1.

$$\begin{bmatrix} v_d \\ v_q \end{bmatrix} = \begin{bmatrix} R + pL_d & -\omega_e L_q \\ \omega_e L_d & R + pL_q \end{bmatrix} \begin{bmatrix} i_d \\ i_q \end{bmatrix} \quad \text{[Formula 1]}$$

Here, R is a coil resistance of the electric motor M, $\omega e$ is an angular velocity of an electrical angle, Ld and Lq are inductances of the dq-axis coordinate system, and p is a differential operator ($=d/dt$).

Furthermore, when the above formula 1 is rewritten into a generally used extended electromotive force expression, it is expressed as formula 2.

$$\begin{bmatrix} v_d \\ v_q \end{bmatrix} = \begin{bmatrix} R + pL_d & -\omega_e L_q \\ \omega_e L_q & R + pL_d \end{bmatrix} \begin{bmatrix} i_d \\ i_q \end{bmatrix} + \begin{bmatrix} 0 \\ (L_d - L_q) \cdot (\omega_e i_d - pi_q) \end{bmatrix} \quad \text{[Formula 2]}$$

Here, in the case where the estimation error Δθ occurs with respect to the dq-axis, formula 2 can be rewritten into formula 3.

$$\begin{bmatrix} v_{dc} \\ v_{qc} \end{bmatrix} = \begin{bmatrix} R + pL_d & -\omega_e L_q \\ \omega_e L_q & R + pL_d \end{bmatrix} \begin{bmatrix} i_{dc} \\ i_{qc} \end{bmatrix} + E_x \begin{bmatrix} -\sin\Delta\theta \\ \cos\Delta\theta \end{bmatrix} \quad \text{[Formula 3]}$$

Here, when focusing on a fact that actions between the inductance with respect to a fundamental wave current and the inductance with respect to a harmonic current are different, and expressing the inductance with respect to the fundamental wave current (static inductance) as Lda and Lqa, and the inductance with respect to the harmonic current (dynamic inductance) as Ldh and Lqh, formula 3 may be expressed as formula 4.

$$\begin{bmatrix} v_{dc} \\ v_{qc} \end{bmatrix} = \begin{bmatrix} R + pL_{dh} & -\omega_e L_{qa} \\ \omega_e L_{qa} & R + pL_{dh} \end{bmatrix} \begin{bmatrix} i_{dc} \\ i_{qc} \end{bmatrix} + E_x \begin{bmatrix} -\sin\Delta\theta \\ \cos\Delta\theta \end{bmatrix} \quad \text{[Formula 4]}$$

However, in the above formula 4, Ex is a value calculated by the following formula 5, and is an extended electromotive force.

$$E_x = \omega i_d (L_{da} - L_{qa}) - pi_q (L_{dh} - L_{qh}) \quad \text{[Formula 5]}$$

When modifying formula 4 in order to calculate the estimation error Δθ, formula 4 may be expressed by formula 6.

$$\begin{bmatrix} e_{dc} \\ e_{qc} \end{bmatrix} = \begin{bmatrix} -E_x \sin\Delta\theta \\ E_x \cos\Delta\theta \end{bmatrix} = \begin{bmatrix} v_{dc} \\ v_{qc} \end{bmatrix} - \begin{bmatrix} R + pL_{dh} & -\omega L_{qa} \\ \omega L_{qa} & R + pL_{dh} \end{bmatrix} \begin{bmatrix} i_{dc} \\ i_{qc} \end{bmatrix} \quad \text{[Formula 6]}$$

When dividing the components of the dc-axis and the qc-axis of formula 6 to calculate the arc tangent thereof, the estimation error Δθ is expressed by formula 7.

$$\Delta\theta = -\tan^{-1}\left\{ \frac{v_{dc} - (Ri_{dc} + pL_{dh}i_{dc}) + \omega L_{qa}i_{qc}}{v_{qc} - \omega L_{qa}i_{dc} - (Ri_{qc} + pL_{dh}i_{qc})} \right\} \quad \text{[Formula 7]}$$

The estimation error calculator 74 is capable of calculating the estimation error $\Delta\theta$ by using the formula 7. However, when reactivating the SynRM, which is the electric motor M, from a state in which the inverter main circuit 50 is suspended, there were the following problems.

According to the above formula 5, since the extended electromotive force is zero in the case where an electric current is not supplied, a rotation phase cannot be calculated with a method of utilizing a no-load voltage. In the same manner, since there is no no-load voltage, even if a coil short-circuit is performed, an electric current would not flow to the motor, and a rotation phase would not be calculated.

In the case of adopting the SynRM as the electric motor M, the inductance significantly changes depending on the supplied electric current. Especially, when providing the center bridge BR2 on the rotor 200 of the SynRM, the change in inductance tends to become larger. For example, in the PMSM, since there is a magnet in the rotor, the center bridge of the rotor is always magnetically saturated. Therefore, the change in inductance with respect to the change in the electric current (dynamic inductance) is small in the PMSM. In contrast, in the SynRM, since the magnetic saturation of the center bridge of the rotor is enhanced by supplying an electric current, the change in inductance with respect to the change in the electric current becomes significant.

Figure 5:
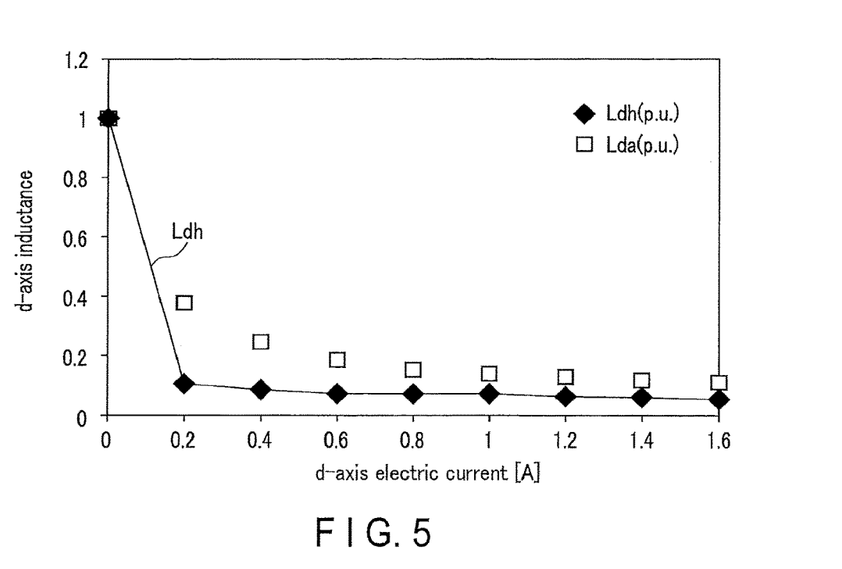
FIG. 5 is a diagram showing an example of a change in a d-axis inductance when electric current is supplied to the electric motor of the configuration shown in FIG. 4.

FIG. 5 is a diagram showing an example of a change in a d-axis inductance when an electric current is supplied to the electric motor of the configuration shown in FIG. 4. In FIG. 5, the square plots show the static inductance Lda, and the rhomboid plots show the dynamic inductance Ldh. The electric motor used for this example performs output of about 10 kW at a rated state. The horizontal axis is a value expressing a ratio of the magnitude of the d-axis electric current when the rated current of the electric motor M is 1. The vertical axis is a value expressing a ratio of the dynamic inductance Ldh when a maximum value of the dynamic inductance Ldh of the electric motor M is 1.

According to the example in FIG. 5, when the d-axis electric current is small, the dynamic inductance Ldh is large, and when the d-axis electric current increases, the value of the dynamic inductance Ldh rapidly decreases. When the d-axis electric current is equal to or larger than about 20 percent of the rated current, the change in the dynamic inductance Ldh becomes smaller.

Figure 6:
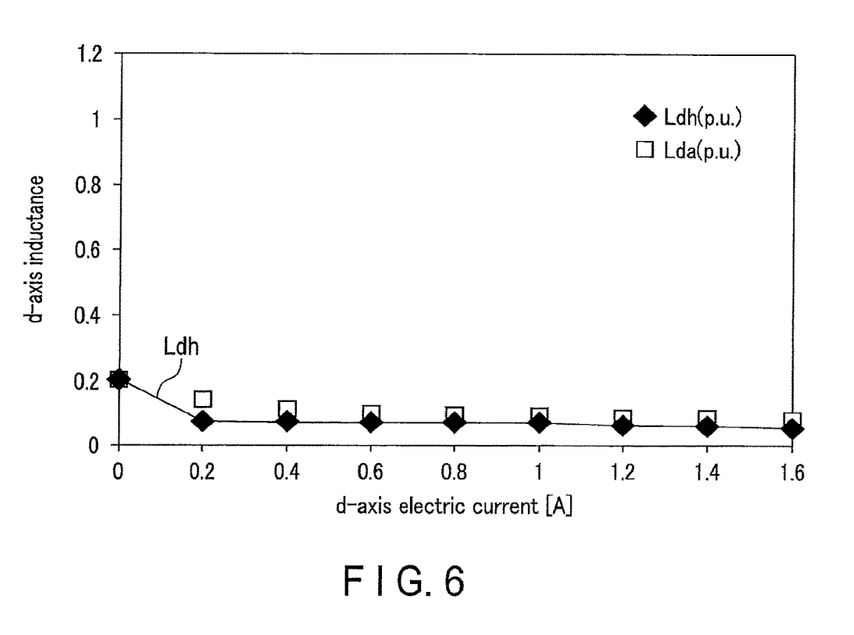
FIG. 6 is a diagram showing an example of a change in the d-axis inductance with respect to the change in an electric current when the electric current is supplied to a SynRM that does not comprise a center bridge in a rotor.

FIG. 6 is a diagram showing an example of a change in the d-axis inductance with respect to the change in an electric current when the electric current is supplied to a SynRM that does not comprise a center bridge in the rotor 200. In the same manner as FIG. 5, in FIG. 6, the square plots show the static inductance Lda, and the rhomboid plots show the dynamic inductance Ldh. The horizontal axis is a value expressing a ratio of the magnitude of the d-axis electric current when the rated current of the electric motor M is 1. The vertical axis is a value expressing a ratio of the dynamic inductance Ldh when a maximum value of the dynamic inductance Ldh of the electric motor M is 1.

According to the example in FIG. 6, the change in the dynamic inductance Ldh is smaller in comparison to the example in FIG. 5 in which the center bridge is provided on the rotor 200. However, there is a tendency that when the d-axis electric current is small, the dynamic inductance Ldh is large; when the d-axis electric current increases, the value of the dynamic inductance Ldh decreases; and when the d-axis electric current is equal to or larger than about 20 percent of the rated current, the change in the dynamic inductance Ldh is smaller. Therefore, regardless of whether or not the center bridge is provided on the rotor 200, when the d-axis electric current is as large as about 20 percent of the rated current, the rotor 200 may be considered as being in a magnetic saturation state.

In the case of calculating the estimation error $\Delta\theta$ using formula 7, the dynamic inductance Ldh is set as a parameter to calculate the estimation error $\Delta\theta$ using the value thereof. The dynamic inductance Ldh is a function established by the d-axis electric current. In the case where the change in the dynamic inductance Ldh with respect to the change in the d-axis electric current is large, a gap will occur between the set parameter value and the actual value, which would disable accurate calculation of the rotation phase, and would render the sensorless control impossible or unstable.

Therefore, in the present embodiment, in the estimation error calculator 74, the dynamic inductance Ldh of the electric motor M used for calculating the rotation phase estimate value $\theta$est is set as a value obtained when the rotor of the electric motor M is magnetically saturated. In other words, in the estimation error calculator 74, a value of the dynamic inductance Ldh, corresponding to an electric current where the d-axis electric current is in a range of at least 20 percent of the rated current and equal to or smaller than the rated current, is set as the parameter of formula 7 to calculate the estimation error $\Delta\theta$. For example, the value may be a value that is equal to or less than 10 percent of the maximum value of the dynamic inductance Ldh, Here, the electric current command generator 10 outputs an electric current command for position search which supplies the d-axis electric current to the electric motor M. The electric current command (electric current command for position search) in an initial estimation is set to a value that magnetically saturates the rotor of the electric motor M. A state in which the rotor of the electric motor M is magnetically saturated is a state in which the change in the dynamic inductance Ldh of the electric motor M with respect to the change in the d-axis electric current is sufficiently small. By setting the value of the dynamic inductance Ldh in the above manner, regardless of the configuration of the SynRM, the estimation error $\Delta\theta$ can be calculated using formula 7. Even in the case of adopting the PMSM as the electric motor M, by setting the dynamic inductance Ldh in the same manner as above, the estimation error $\Delta\theta$ can be calculated using formula 7.

According to the examples in FIG. 5 and FIG. 6, since the value of the dynamic inductance Ldh becomes stable when the d-axis electric current is about 20 percent of the rated current, when performing initial estimation of the rotor position, the value of the electric current command for position search should be set so that the d-axis electric current flowing to the electric motor M becomes at least about 20 percent of the rated current. The maximum value of the electric current command value for position search is preferably equal to or less than the rated current. Depending on the configuration of the electric motor M, when the electric current for position search increases, a torque shock would cause the electric motor M to breakdown, or cause equipment associated with the electric motor M to breakdown. Therefore, in the case where there are torque shock rules, the setting should further be made in a manner that would not cause the torque shock.

The maximum value of the electric current that can be supplied to the electric motor upon initial estimation can be determined as follows by a tolerance value Ts of the torque. The torque for which an estimation error $\Delta\theta \approx \Delta\beta$ is considered can be expressed by the following formula.

$$T = -P_P(L_{da} - L_{qa})\frac{I_{dq}^2}{2}\sin2(\beta_{\_ref} + \Delta\beta)$$

During the control of the initial phase estimation, the control is set as βref=0, and a torque proportional to Δβ as in the following formula is output.

$$T = -P_p(L_{da} - L_{qa})\frac{I_{qd}^2}{2}\sin2\Delta\beta$$

When the torque tolerance value is Ts, the electric current for position search that can be supplied to the electric motor M can be calculated as follows.

$$T = -P_p(L_{da} - L_{qa})\frac{I_{dq}^2}{2}\sin2\Delta\beta < T_s$$

$$I_{dq} < \sqrt{\left|\frac{2T_s}{-P_p(L_{da} - L_{qa})\sin2\Delta\beta}\right|}$$

$$I_{dq} < \sqrt{\left|\frac{2T_s}{-P_p(L_{da} - L_{qa})}\right|}\Bigg|_{worst-case=\Delta\beta\pm\frac{\pi}{4}}$$

The PLL calculator 76 receives the estimation error Δθ calculated by the estimation error calculator 74, and calculates and outputs a rotation speed estimation value ωest' so that the estimation error Δθ becomes zero. Since this rotation speed estimation value ωest' includes frequency components other than the fundamental wave, the frequency components other than the fundamental wave components are removed by a low-pass filter FL, and are output to the estimation error calculator 74 and the integrator 78 as a rotation speed estimation value ωest. The PLL calculator 76 and the low-pass filter FL are calculators that calculate the rotation speed estimation value ωest' so that the estimation error Δθ becomes zero.

The integrator 78 integrates the rotation speed estimation value ωest' to calculate the rotation phase estimation value θest, and outputs it to the dq/αθ converter 20 and the αβ/dq converter 72.

Next, an example regarding the operation of the inverter device when activating the inverter device from suspension, or a state pursuant thereto, will be explained.

Figure 7:
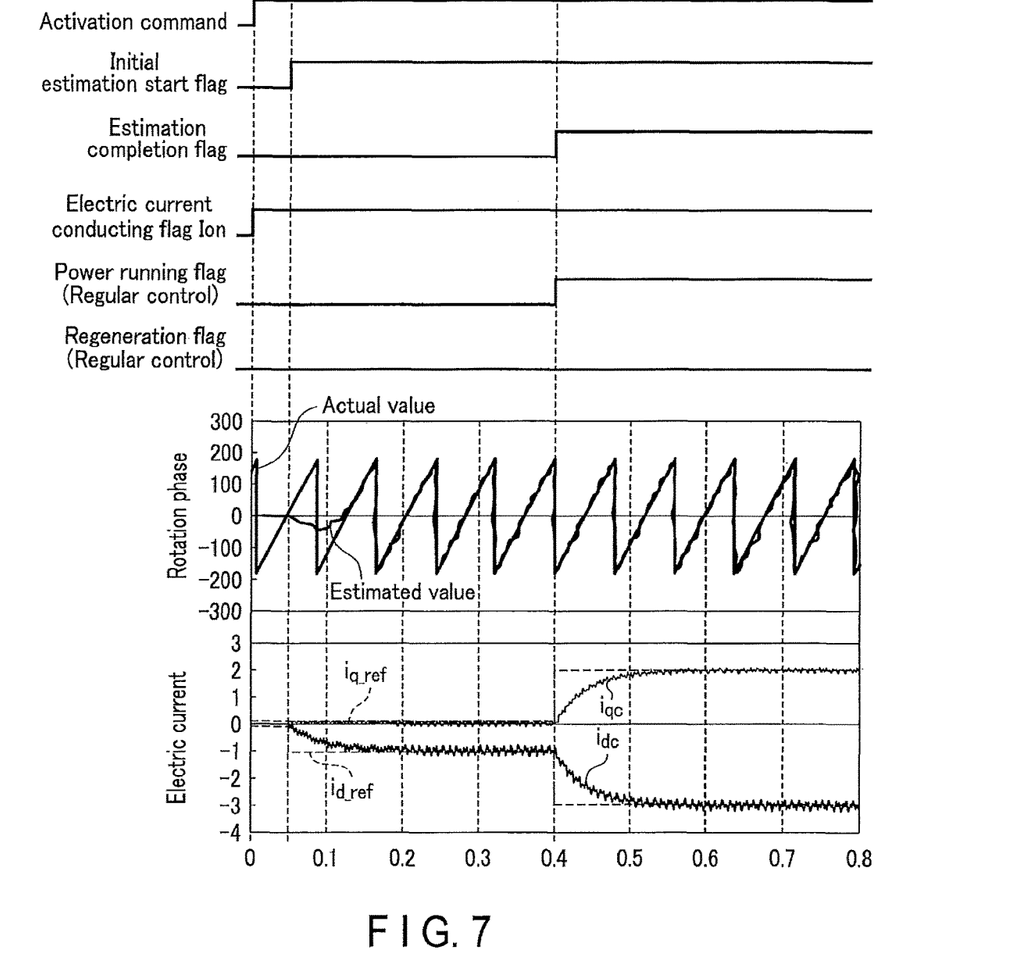
FIG. 7 is a diagram for explaining an example of an operation of the inverter that performs a regular control after performing an initial estimation of a rotor position of the electric motor.

FIG. 7 is a diagram for explaining an example of an operation of the inverter that performs a regular control after an initial estimation of the rotor position of the electric motor is performed. Here, the electric current phase command idq_ref to be supplied is a value that is at least 20 percent of the rated current of the d-axis electric current. An example of supplying the electric current to a phase that has electrically progressed 180 deg (−d-axis direction) will be explained.

First of all, in a state where the inverter is suspended, the host controller CTR raises an activation command and an electric current conducting flag Ion from zero to one. When the activation command from the host controller CTR becomes one, the inverter performs activation processing.

Subsequently, the host controller CTR raises the initial estimation start flag from zero to one. When the electric current conducting flag Ion is one, and the initial estimation start flag becomes one, the electric current command generator 10 of the inverter outputs the d-axis electric current command id_ref and the q-axis electric current command iq_ref. The d-axis electric current command id_ref and the q-axis electric current command iq_ref output from the electric current command generator 10 at this time are the electric current commands for position search, which are at least 20 percent of the rated current of the d-axis electric current, and are set so as to supply the electric current to a phase electrically progressed by 180 deg (−d-axis direction). When the electric motor M is driven by this electric current command for position search, the magnetic saturation of the rotor 200 of the electric motor M is enhanced, bringing the rotor of the electric motor M to a sufficiently magnetic saturated state, thereby stabilizing the dynamic inductance Ldh at a value of about 10 percent of a maximum value.

The rotation phase estimator 70 starts the operation of the initial estimation when the initial estimation start flag becomes one. Here, the estimation error calculator 74 sets the parameter of the dynamic inductance to be used in formula 7 mentioned above to a value corresponding to, for example, an electric current value between at least 20 percent of the rated current and equal to or less than the rated current.

According to FIG. 7, since the value of the dynamic inductance of the electric motor M is unstable from the start of the initial estimation up to when the electric current flowing to the electric motor M becomes the d-axis electric current command id_ref, the estimation error between the rotation phase estimation value θest and the actual value becomes large. However, when the d-axis electric current flowing to the electric motor M becomes close to the d-axis electric current command value, the magnetic saturation of the rotor 200 of the electric motor M is enhanced, which reduces the estimation error Δθ between the rotation phase estimation value θest and the actual value. When the d-axis electric current that flows to the electric motor M becomes almost equal to the d-axis electric current command value, the estimation error Δθ between the rotation phase estimation value θest and the actual value also becomes almost zero, which allows a correct rotation phase estimation value θest to be calculated.

Subsequently, the host controller CTR raises an estimation completion flag and a power running flag from zero to one. The host controller CTR may raise the estimation completion flag after a lapse of a predetermined time from when the initial estimation start flag was raised, or when the value of estimation error Δθ is monitored, and the magnitude of the estimation error Δθ becomes equal to or less than a predetermined value.

When the estimation completion flag and the power running flag rise, the host controller CTR outputs the electric current command idq_ref of a regular control to the inverter. The example of FIG. 7 shows an example of performing power running after the initial estimation. In this regular control, the rotation phase estimation value θest and the rotation speed estimation value ωest estimated at the initial estimation are adopted as initial values of the rotation phase and the rotation speed of the electric motor M. The electric current command generator 10 sets the electric current phase command to a value delayed from the time of the initial estimation when the estimation completion flag output from the host controller CTR rises after the initial estimation is ended, and the power running flag also rises. In this example, in the operation of the initial estimation, since the electric current command for position search is set to supply the electric current in a −d-axis direction, the change in the d-axis electric current command can be made small when starting the power running control, which allows a smooth transition to be carried out from the initial estimation to the regular control.

Figure 8:
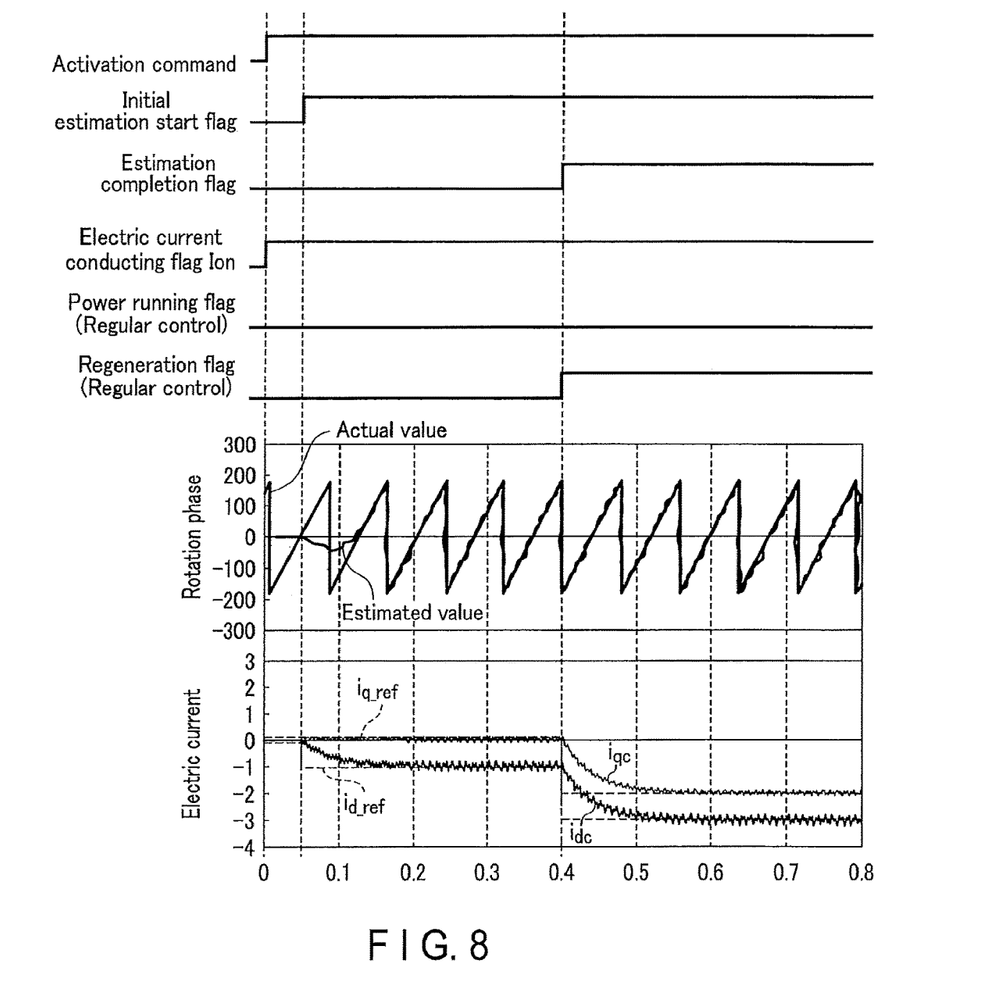
FIG. 8 is a diagram for explaining an example of an operation of the inverter device that performs a regular control after performing an initial estimation of a rotor position of the electric motor.

FIG. 8 is a diagram for explaining an example of an operation of the inverter that performs the regular control after performing the initial estimation of the rotor position of the electric motor. In this example, the operation of the initial estimation is the same as that in the example shown in FIG. 7.

After the initial estimation start flag is raised, the host controller CTR raises the estimation completion flag and a regeneration flag from zero to one. The host controller CTR may raise the estimation completion flag after a lapse of a predetermined time from when the initial estimation start flag is raised. The host controller CTR may also raise the estimation completion flag when the value of estimation error Δθ is monitored, and the magnitude of the estimation error Δθ becomes equal to or less than a predetermined value.

When the estimation completion flag and the regeneration flag rise, the host controller CTR outputs the electric current command idq_ref of the regular control to the inverter. The example of FIG. 8 shows an example of performing regeneration after the initial estimation. In this regular control, the rotation phase estimation value θest and the rotation speed estimation value ωest estimated at the initial estimation are adopted as initial values of the rotation phase and the rotation speed of the electric motor M. The electric current command generator 10 sets the electric current phase command to a value ahead of the initial estimation time when the estimation completion flag output from the host controller CTR rises after the initial estimation is ended, and the regeneration flag also rises. In this example, in the operation of the initial estimation, since the electric current command for position search is set to supply the electric current in a −d-axis direction, the change in the d-axis electric current command can be made small when starting a regeneration control, which allows a smooth transition to be carried out from the initial estimation to the regular control.

In the above manner, according to the drive system and the inverter of the present embodiment, an inverter that accurately calculates the estimation values of the rotation phase and the rotation speed of the electric motor, and is capable of performing sensorless control with stability can be provided.

Hereinafter, a drive system and an inverter of a second embodiment will be explained with reference to the drawings.

Figure 9:
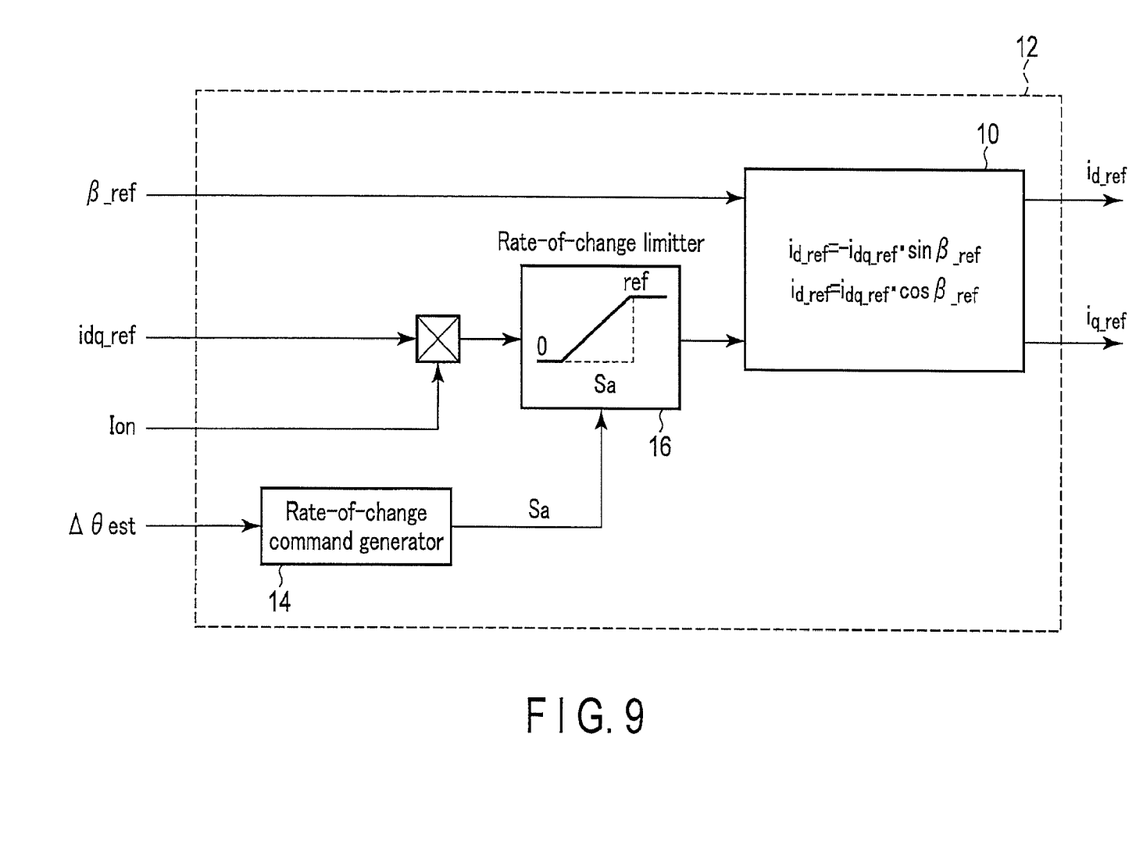
FIG. 9 is a diagram for explaining a configuration example of an electric current command generator of a drive system and an inverter of a second embodiment.

FIG. 9 is a diagram for explaining a configuration example of an electric current command generator of the drive system and the inverter of the second embodiment. In the following explanation, the same structures as those in the above-mentioned first embodiment will be given the same reference numerals, and explanations thereof will be omitted.

The inverter of the present embodiment comprises an electric current command generator 12.

The electric current command generator 12 comprises a rate-of-change command generator 14, a rate-of-change limiter 16, and an electric current command calculator 18.

The rate-of-change command generator 14 receives an estimation error Δθ calculated at an estimation error calculator 74, and outputs a rate-of-change Sa corresponding to a value of the estimation error Δθ. The rate-of-change command generator 14, for example, decreases the rate-of-change Sa as the value of the estimation error Δθ increases, and increases the rate-of-change Sa as the value of the estimation error Δθ decreases. An increase rate Sa of a rate-of-change limit should be changed in accordance with a rotation phase error, and is determined so that the rotation phase error falls within a predetermined value.

The rate-of-change limiter 16 receives an electric current amplitude command value idq_ref and a rate-of-change Sa. At a stage prior to the rate-of-change limiter 16, a calculator is provided. The calculator inputs the electric current amplitude command idq_ref to the rate-of-change limiter 16 only when an electric current conducting flag Ion is ON (=1). The rate-of-change limiter 16 gradually increases the electric current amplitude command idq_ref that changes in steps from zero to one based on the value of the rate-of-change Sa, and outputs the obtained electric current amplitude command idq_ref.

The electric current command calculator 18 receives the electric current amplitude command idq_ref output from the rate-of-change limiter 16, and an electric current phase command β_ref input externally. The electric current command calculator 18 performs the same calculation as the electric current command generator 10 of the above-mentioned first embodiment. In other words, the electric current command calculator 18 calculates a d-axis electric current command value id_ref and a q-axis electric current command value iq_ref by the following formula.

$$id\_ref = idq\_ref \cdot \sin \beta\_ref$$

$$iq\_ref = idq\_ref \cdot \cos \beta\_ref$$

In the above-mentioned first embodiment, in the case where the electric current amplitude command idq_ref changes from zero to one in steps, a torque shock would occur in the case where an electric current is supplied in a state where the rotation phase estimation is not accurately performed as when starting the initial estimation. For example, a torque of an SynRM is expressed by the following formula 8.

$$T = P_p(L_{da} - L_{qa})i_d i_q \qquad \text{[Formula 8]}$$
$$= -P_p(L_{qa} - L_{qa})I_{dq}^2 \sin(\beta\_ref)$$

The above formula 8 expresses a case in which there is no error in the rotation phase estimation. In the case where there is an error in the rotation phase estimation, an estimation error Δβ equivalently occurs in an electric current phase, which is expressed as β_ref+Δβ. The torque in such case may be expressed in the manner of the following formula 9.

$$T = P_p(L_{qa} - L_{qa})\{-I_{dq}\sin(\beta\_ref + \Delta\beta)\}\{I_{dq}\cos(\beta\_ref + \Delta\beta)\} \qquad \text{[Formula 9]}$$

Furthermore, in the above formula 9, when the electric current phase command is to be supplied in a −d-axis direction (β_ref=90 deg), this may be expressed in the manner of the following formula 10.

$$T = \frac{P_p}{2}(L_{qa} - L_{qa})I_{qa}^2 \sin 2\Delta\beta \qquad \text{[Formula 10]}$$

According to the above formula 10, it may be understood that the torque shock is proportional to the square of the electric current amplitude and sin 2Δβ. In the case where rotation phase estimation error is 45 deg when starting the electric current supply, the torque shock that occurs will become a maximum value. If a torque shock occurs at the initial estimation, which is prior to performing a power running control and a regeneration control, it would cause degradation in the ride quality in the case of, for example, a railroad.

In contrast, in the present embodiment, a rate-of-change limiter 16 is provided for an electric current to be supplied upon initial estimation. The torque shock can be reduced by limiting the rate of change of the electric current amplitude command idq_ref by the rate-of-change limiter 16.

In the present embodiment, the rate-of-change Sa is determined in accordance with the value of the rotation phase error Δθ. However, other than using the rotation phase error Δθ, the torque shock upon initial estimation can also be reduced by a method of determining the rate-of-change by directly detecting the torque, or by a method of determining the rate-of-change in advance using data of an analysis result, etc.

In other words, according to the present embodiment, the same effect as that in the first embodiment mentioned above can be obtained. Furthermore, the torque shock upon initial estimation can be reduced, and the ride quality and the torque estimation accuracy of a vehicle, etc. on which the inverter device and the electric motor are installed can be improved.

Hereinafter, an inverter device of a third embodiment will be explained with reference to the drawings.

Figure 10:
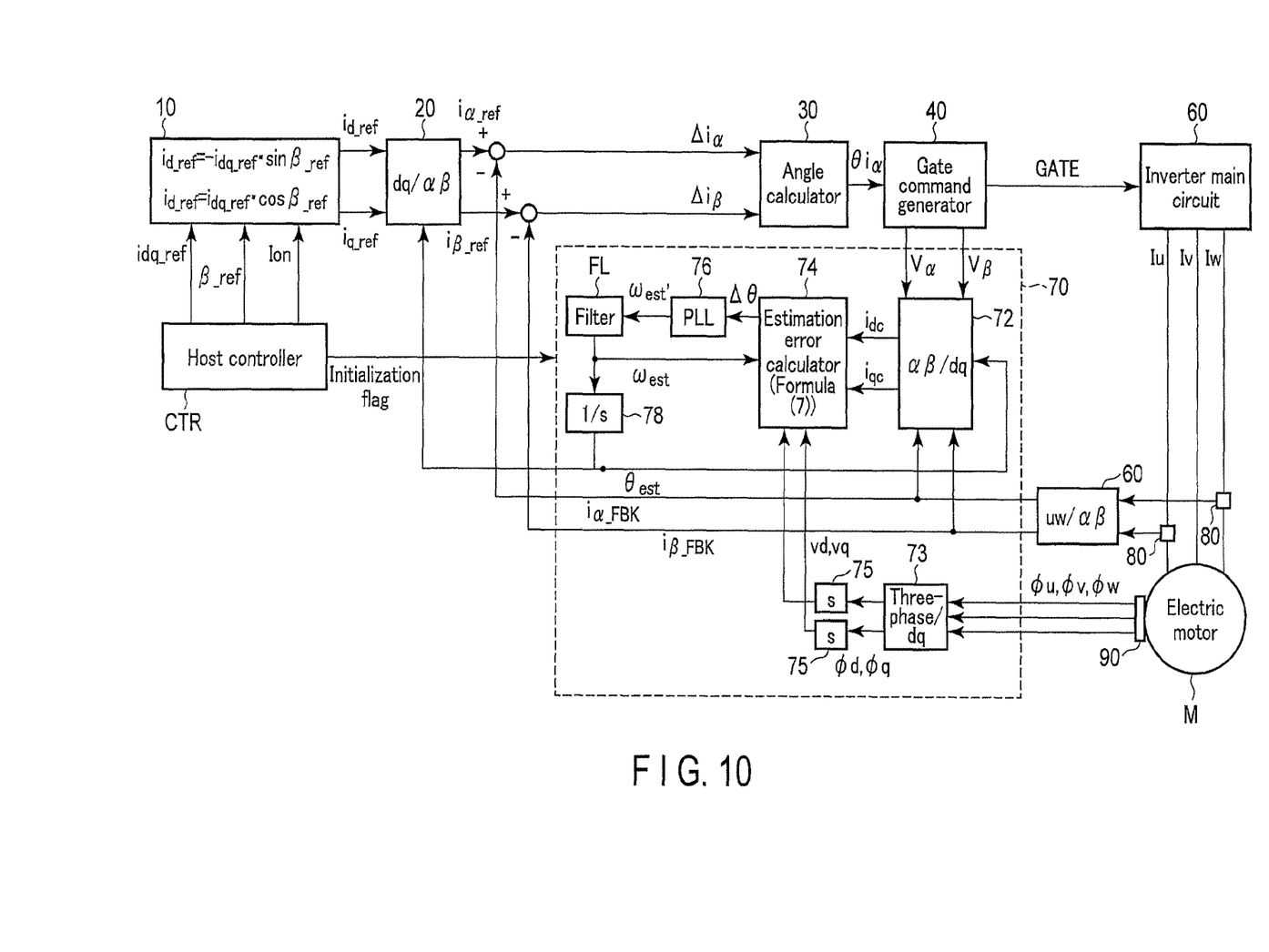
FIG. 10 is a block diagram for explaining a configuration example of a drive system and an inverter of a third embodiment.

FIG. 10 is a block diagram for explaining a configuration example of a drive system and the inverter device of the third embodiment. In the following explanation, the same structures as those in the above-mentioned first embodiment will be given the same reference numerals, and will be omitted of explanations thereof.

The inverter of the present embodiment further comprises a magnetic flux detector 90. A rotation phase estimator 70 further comprises a three-phase/dq converter 73 and two differentiators 75.

The magnetic flux detector 90 is, for example, a magnetic sensor such as a Hall element, and detects and outputs AC magnetic fluxes φu, φv, and φw of an electric motor M. The AC magnetic fluxes φu, φv, and φw of each phase can be expressed as φu=φcos ωt, φv=cos(ωt−120°, and φw=cos (ωt−240°).

The three-phase/dq converter 73 receives the AC magnetic fluxes φu, φv, and φw detected by the magnetic flux detector 90, converts them into vector values φd and φq of a dq-axis coordinate system, and outputs the vector values.

The vector values φd and φq output from the three-phase/dq converter 73 are differentiated respectively by the differentiators 75, and voltage values Vd and Vq of the dq-axis coordinate system are calculated by the following formula.

$$V_d = s\phi_d = \frac{d}{dt}\phi_d$$

$$V_q = s\phi_q = \frac{d}{dt}\phi_q$$

The voltage values Vd and Vq calculated by the differentiators 75 are input to an estimation error calculator 74. The estimation error calculator 74 calculates an estimation error Δθ by using the voltage value Vd for a Vdc of the above formula 7, and using the voltage value Vq for a Vqc of formula 7. Therefore, in the inverter of the present embodiment, the output voltage target vector calculator 42 of the gate command generator 40 of the above-mentioned first embodiment may be omitted.

Except for the above configurations, the inverter of the present embodiment is the same as the inverter of the above-mentioned first embodiment. The inverter of the present embodiment can produce the same effect as the inverter device of the first embodiment. Instead of an electric current command generator 10 of the inverter of the present embodiment, the electric current command generator 12 of the second embodiment may be adopted. In such case, the same effect as the above-mentioned second embodiment can be produced.

In the above-mentioned embodiments, examples of adopting the SynRm as the electric motor M have been explained. However, even in the case of adopting the PMSM, etc. as the electric motor M, the same effect as the above-mentioned embodiments can be produced.

In the above embodiment, a system using an electric current tracking type PWM control that determines a gate command to the inverter main circuit 50 in accordance with an electric current deviation has been described. However, as long as the method is to control an electric current, other methods can also produce the same effect. For example, the same effect can also be produced even by a method such as a PI control which calculates an inverter voltage command based on the electric current deviation. In the above-mentioned embodiments, an example of a method of directly determining the gate command from an angle of the electric current vector deviation has been given. However, as long as the gate command for controlling an electric current can be determined, the same effect will be produced even by using methods such as a triangular wave comparative modulation or a spatial vector modulation.

In the above-mentioned embodiments, an example of determining the electric current amplitude command idq_ref to be supplied based on an electric current-inductance characteristic that flows in the electric motor has been explained. However, as long as it is a method that can determine that the synchronous reluctance motor (SynRM) has been magnetically saturated, other methods (for example, a method of determining an electric current command based on a magnetic flux density of the center bridge BR2 of the rotor 200) may also be considered.

In the above-mentioned embodiments, a method of supplying the electric current with the electric current command for position search in the −d-axis direction has been explained. However, it is also possible to estimate the rotation phase and the rotation speed even by supplying the electric current with the electric current command for position search in the +d-axis direction. In the above-mentioned embodiments, a method of calculating the rotation phase error on the rotation coordinate system, and computing the rotation phase and the rotation speed from the information thereof has been given as an example. However, for example, the same effect may be produced even by a method of directly computing the rotation phase as disclosed in Patent Literature 1.

Furthermore, in the above-mentioned embodiments, the gate command to the inverter is determined in accordance with the electric current deviation. However, the means for determining the gate command is not limited to the electric current deviation. As long as it is a method that can determine a switching method for controlling the electric current, such as a method based on a motor magnetic flux vector, the same effect may be produced.

While certain embodiments have been described, these embodiments have been presented by way of example only, and are not intended to limit the scope of the embodiments. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit.

All of the calculations performed in the inverter of the above-mentioned embodiments may be realized by software, hardware, or a combination of the software and hardware. The inverter device of the above-mentioned embodiments may, for example, include one or more processors and memories, and may read out a program recorded on the memories to perform various calculations by the processors.

The invention claimed is:

1. A drive system comprising:
an electric motor;
an inverter main circuit that outputs an alternating electric current for driving the electric motor;
an electric current detector that detects an electric current value of the alternating electric current output from the inverter main circuit;
an electric current command generator that generates an electric current command value corresponding to an electric current to be supplied to the electric motor;
a gate command generator that generates a gate command of the inverter main circuit so that the electric current command value matches the electric current value detected by the electric current detector;
an output voltage target vector calculator that calculates an output voltage target vector of the inverter main circuit based on the gate command; and
a rotation phase estimator that calculates a rotation phase estimation value of the electric motor based on the electric current value detected by the electric current detector and the output voltage target vector of the inverter main circuit, in an initial estimation of when activating the inverter main circuit, wherein
the electric current command value in the initial estimation is a value to supply an electric current for magnetically saturating a rotor of the electric motor, and
in the rotation phase estimator, a dynamic inductance of the electric motor used for calculating the rotation phase estimation value is a value of when the rotor of the electric motor is magnetically saturated.

2. The drive system according to claim 1, wherein the electric current output from the inverter main circuit to the electric motor in the initial estimation is a value that sets the dynamic inductance of the electric motor to no more than 10 percent of a maximum value thereof.

3. The drive system according to claim 1, wherein the electric current output from the inverter main circuit to the electric motor by the electric current command value in the initial estimation is a value that is at least 20 percent of a rated current of the electric motor and no more than the rated current.

4. The drive system according to claim 3, wherein an axis at which a static inductance in the electric motor becomes a minimum is set as a d-axis, and an electric current phase command among the electric current command values is in a direction electrically progressed by 180 degrees from the d-axis.

5. The drive system according to claim 1, wherein
the electric current command value comprises an electric current amplitude command and an electric current phase command, and the electric current command generator further comprises a rate-of-change command generator that outputs a rate of change of a value in accordance with a magnitude of an estimation error of the rotation phase estimation value, and a rate-of-change limit that changes the electric current amplitude command by the rate of change in accordance with a value of the rate-of-change.

6. The drive system according to claim 1, wherein
the electric current command value comprises an electric current amplitude command and an electric current phase command, wherein
when an estimation completion flag output from a host controller rises after the initial estimation is ended, and a power running flag also rises, the electric current phase command becomes a value later than the initial estimation time, and
when the estimation completion flag output from the host controller rises after the initial estimation is ended, and a regeneration flag also rises, the electric current phase command becomes a value preceding the initial estimation time.

7. An inverter comprising:
an inverter main circuit that outputs an alternating electric current for driving an electric motor that is connected;
an electric current detector that detects an electric current value of the alternating electric current output from the inverter main circuit;
an electric current command generator that generates an electric current command value corresponding to an electric current to be supplied to the electric motor;
a gate command generator that generates a Elate command of the inverter main circuit so that the electric current command value matches the electric current value detected by the electric current detector;
an output voltage target vector calculator that calculates an output voltage target vector of the inverter main circuit based on the gate command; and
a rotation phase estimator that calculates a rotation phase estimation value of the electric motor based on the electric current value detected by the electric current detector and the output voltage target vector, wherein
the electric current output from the inverter main circuit when starting the calculation by the rotation phase estimator is controlled to be between no more than a rated current and at least 20 percent of the rated current,
the electric current command value comprises an electric current amplitude command and an electric current phase command, and
the electric current command generator further comprises a rate-of-change command generator that outputs a rate of change of a value in accordance with a magnitude of an estimation error of the rotation phase estimation value, and a rate-of-change limit that changes the electric current amplitude command by the rate of change in accordance with a value of the rate of change.

8. An inverter comprising:
an inverter main circuit that outputs an alternating electric current for driving an electric motor that is connected;
an electric current detector that detects an electric current value of the alternating electric current output from the inverter main circuit;
an electric current command generator that generates an electric current command value corresponding to an electric current to be supplied to the electric motor;
a gate command generator that generates a gate command of the inverter main circuit so that the electric current command value matches the electric current value detected by the electric current detector;

an output voltage target vector calculator that calculates an output voltage target vector of the inverter main circuit based on the gate command; and a rotation phase estimator that calculates a rotation phase estimation value of the electric motor based on the electric current value detected by the electric current detector and the output voltage target vector, wherein the electric current output from the inverter main circuit when starting the calculation by the rotation phase estimator is controlled to be between no more than a rated current and at least 20 percent of the rated current, the electric current command value comprises an electric current amplitude command and an electric current phase command, and when an estimation completion flag output from a host controller rises after the initial estimation is ended, and a power miming flag also rises, the electric current phase command becomes a value later than the initial estimation time, and when the estimation completion flag output from the host controller rises after the initial estimation is ended, and a regeneration flag also rises, the electric current phase command becomes a value preceding the initial estimation time.

\* \* \* \* \*